(12) United States Patent
Mandeville

(10) Patent No.: US 11,214,935 B2
(45) Date of Patent: Jan. 4, 2022

(54) BUCKET HEIGHT CONTROL SYSTEM

(71) Applicant: HUSQVARNA AB, Huskvarna (SE)

(72) Inventor: Kenneth Mandeville, Weddington, NC (US)

(73) Assignee: Husqvarna AB, Huskvarna (SE)

( * ) Notice: Subject to any disclaimer, the term of this patent is extended or adjusted under 35 U.S.C. 154(b) by 268 days.

(21) Appl. No.: 16/481,507

(22) PCT Filed: Apr. 20, 2018

(86) PCT No.: PCT/IB2018/052776
§ 371 (c)(1),
(2) Date: Jul. 29, 2019

(87) PCT Pub. No.: WO2018/193425
PCT Pub. Date: Oct. 25, 2018

(65) Prior Publication Data
US 2019/0382972 A1  Dec. 19, 2019

Related U.S. Application Data

(60) Provisional application No. 62/487,594, filed on Apr. 20, 2017.

(51) Int. Cl.
*E01H 5/04* (2006.01)
*B62D 55/08* (2006.01)

(52) U.S. Cl.
CPC ............... *E01H 5/04* (2013.01); *B62D 55/08* (2013.01)

(58) Field of Classification Search
CPC .............. E01H 5/04; E01H 5/08; B62D 55/08
See application file for complete search history.

(56) References Cited

U.S. PATENT DOCUMENTS 3,886,675 A * 6/1975 Maisonneuve ........... E01H 8/06
37/211
4,391,052 A * 7/1983 Guy, Jr. ................. E01H 5/098
37/236
(Continued)

FOREIGN PATENT DOCUMENTS

GB         1064688 A    4/1967
JP       H11200331 A    7/1999
(Continued)

OTHER PUBLICATIONS

Swedish Search Report for Application No. 1951013-0 dated Jun. 9, 2020.
(Continued)

*Primary Examiner* — Jessica H Lutz
(74) *Attorney, Agent, or Firm* — Burr & Forman, LLP

(57) ABSTRACT

A walk-behind, powered device includes an engine, a chassis configured to support the engine, a mobility assembly including a mobility assembly frame, a working assembly operably coupled to the engine to perform a working function responsive at least in part to operation of the engine, a control panel operably coupled to the chassis and comprising a control operator, and a height adjuster. The mobility assembly frame is configured to pivot relative to the chassis. The working assembly has a fixed orientation relative to the chassis. The height adjuster is configured to control positioning of the chassis relative to the mobility assembly frame based on a length of the height adjuster. The length of the height adjuster is changeable based on positioning of the control operator.

22 Claims, 7 Drawing Sheets

(56) References Cited

U.S. PATENT DOCUMENTS

| | | | |
|---|---|---|---|
| 4,869,003 A * | 9/1989 | O'Loughlin | E01H 5/098 37/255 |
| 5,410,824 A * | 5/1995 | Pedersen | E01H 5/04 37/214 |
| 5,438,770 A * | 8/1995 | Miller | E01H 5/04 37/227 |
| 6,154,985 A * | 12/2000 | Champagne | E01H 5/098 37/222 |
| 6,705,028 B2 * | 3/2004 | Hanafusa | E01H 5/04 37/246 |
| 7,716,906 B2 | 5/2010 | Swart | |
| 7,997,016 B2 | 8/2011 | Yamazaki et al. | |
| 9,003,751 B2 | 4/2015 | Lancaster | |
| 9,157,202 B2 | 10/2015 | Fukano et al. | |
| 9,228,308 B2 | 1/2016 | Fukano et al. | |
| 2002/0005001 A1 | 1/2002 | Yoshida et al. | |
| 2007/0022635 A1 * | 2/2007 | Yamazaki | E01H 5/04 37/244 |
| 2010/0192422 A1 | 8/2010 | Yamazaki et al. | |
| 2011/0146112 A1 * | 6/2011 | Morrell | E01H 5/04 37/254 |
| 2015/0107134 A1 * | 4/2015 | Fukano | E01H 5/098 37/234 |
| 2015/0107135 A1 | 4/2015 | Fukano et al. | |
| 2015/0289435 A1 | 10/2015 | Moore et al. | |
| 2016/0021812 A1 * | 1/2016 | Modzik | B62D 51/06 37/244 |
| 2017/0015342 A1 | 1/2017 | Schmalz | |
| 2017/0247052 A1 * | 8/2017 | Mandeville | B62D 11/006 |
| 2017/0259640 A1 * | 9/2017 | Ohashi | F16K 31/025 |
| 2019/0176562 A1 * | 6/2019 | Ohashi | B60G 17/0523 |
| 2021/0055158 A1 * | 2/2021 | Hunt | G01J 1/44 |

FOREIGN PATENT DOCUMENTS

| | | |
|---|---|---|
| JP | 2003082628 A | 3/2003 |
| JP | 2004278052 A | 10/2004 |
| JP | 3821917 B2 | 9/2006 |
| KR | 10-1209236 B1 | 12/2012 |

OTHER PUBLICATIONS

"Snow Blower HSS928A HSS1332A," American Honda Motor Co., Inc., pp. 1-92 (2016).

International Search Report and Written Opinion for International Application No. PCT/IB2018/052776 dated Sep. 20, 2018.

* cited by examiner

BUCKET HEIGHT CONTROL SYSTEM

CROSS REFERENCE TO RELATED APPLICATION

This application claims priority to U.S. application No. 62/487,594 filed Apr. 20, 2017, the entire contents of which are hereby incorporated by reference in its entirety.

TECHNICAL FIELD

Example embodiments generally relate to outdoor power equipment and, more particularly, relate to walk behind power equipment for snow removal that have the ability to control bucket height.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers. The snow removal equipment may, in some cases, be operated by a user that walks behind the equipment and is therefore considered walk-behind equipment. However, snow blower or snow thrower attachments can sometimes be added to lawn tractors or other riding yard maintenance vehicles as well.

Walk-behind snow blowers (i.e., snow removal equipment) may be easier to operate and control with a mobility assembly that is powered. Thus, for example, power may be provided from the engine to turn not only the snow removal system of the snow removal equipment, but also power the wheels or tracks (i.e., the mobility assembly) via which the snow removal equipment moves. The operator can then focus more directly on steering and operation of the snow removal equipment instead of being concerned with providing propulsion.

The mobility assemblies of snow removal equipment typically support a chassis or frame that is directly coupled to a bucket inside which impellers or blades for performing the snow removal functions are housed. The fact that the bucket is directly coupled to the chassis means that the bucket typically has only a very limited number of discrete height settings since the chassis would need to be adjusted in its orientation relative to the mobility assembly to change bucket height. This arrangement can lead to significant limitations in the configurations that can be achieved by the snow removal equipment and prevent optimal snow removal or transportation in certain situations.

BRIEF SUMMARY OF SOME EXAMPLES

Some example embodiments may therefore provide the ability to give operators a greater degree of control with respect to setting bucket height for walk behind snow removal equipment.

In one example embodiment, a walk-behind, powered device is provided. The device may include an engine, a chassis configured to support the engine, a mobility assembly including a mobility assembly frame, a working assembly operably coupled to the engine to perform a working function responsive at least in part to operation of the engine, a control panel operably coupled to the chassis and comprising a control operator, and a height adjuster. The mobility assembly frame is configured to pivot relative to the chassis. The working assembly has a fixed orientation relative to the chassis. The height adjuster is configured to control positioning of the chassis relative to the mobility assembly frame based on a length of the height adjuster. The length of the height adjuster is changeable based on positioning of the control operator.

In another example embodiment, a working assembly height adjustment system for a walk behind, powered device is provided. The system may include a chassis supporting an engine of the powered device, a mobility assembly frame supporting a mobility assembly operably coupled to the engine to provide mobility of the powered device responsive at least in part to operation of the engine, and a height adjuster disposed between respective portions of the mobility assembly frame and the chassis to control positioning of the chassis relative to the mobility assembly frame based on a length of the height adjuster. The working assembly may have a fixed orientation relative to the chassis. The chassis may be pivotally mounted to the mobility assembly frame. The length of the height adjuster may be changeable based on positioning of a control operator disposed at a control panel of the powered device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
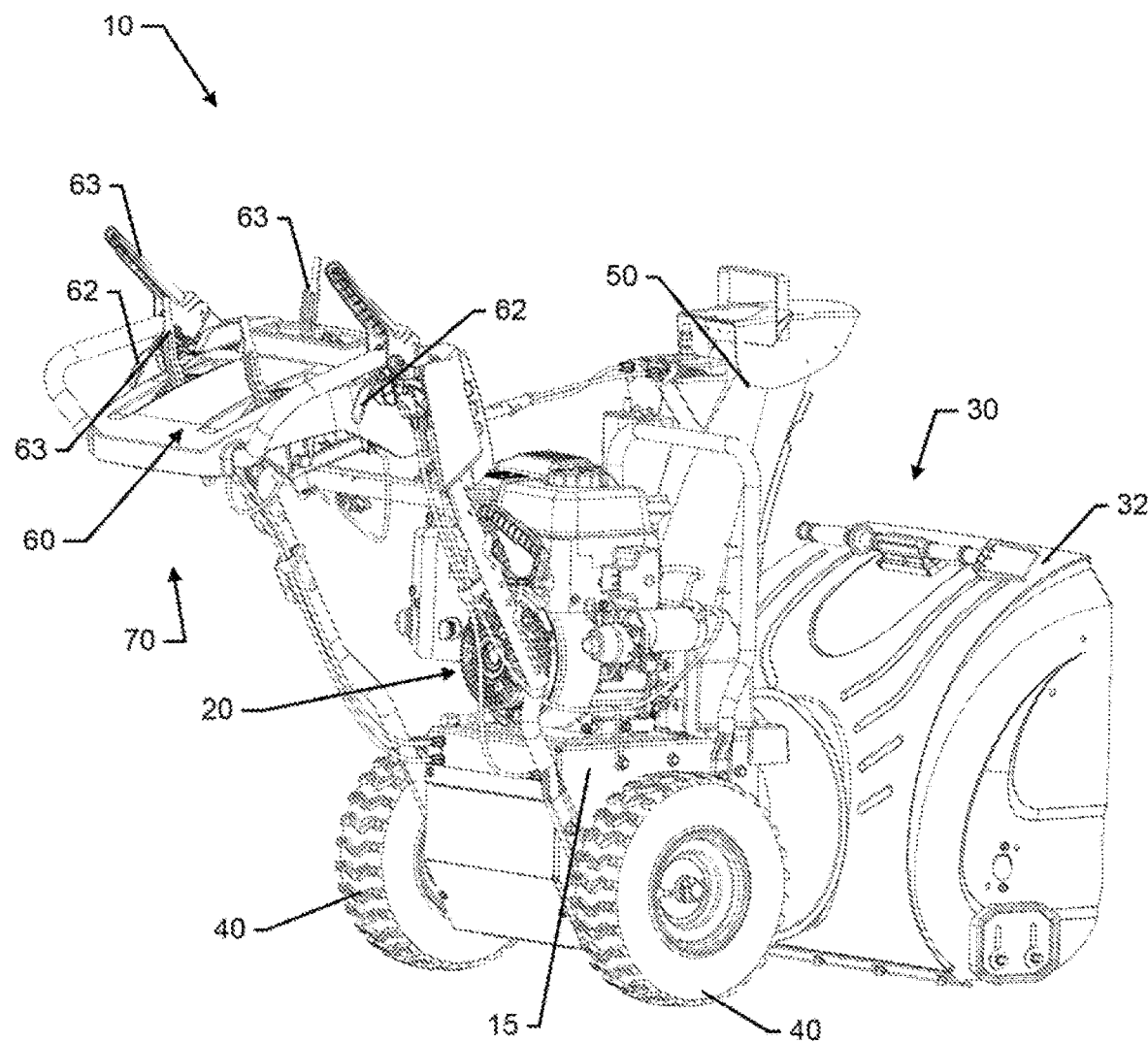
FIG. 1 illustrates a perspective view of a snow removal device according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For a snow blower or snow thrower (i.e., snow removal equipment), or other walk behind devices that employ a working assembly with a fixed orientation relative to the chassis of the device, and for which powered mobility is provided, the device may be configured to enable selective adjustments of the height of the working assembly by altering the position of the chassis relative to the mobility assembly. Moreover, a relatively simple control operator (or lever) may be provided conveniently for hand operation at a control panel or operator station of the device. The control operator may allow different modes of height adjustment to be employed. In this regard, some embodiments may employ an infinitely adjustable height adjuster (e.g., a gas strut) that is configured to be actuated by the control operator in one of two modes. The first mode may enable discrete changes to the height of the working assembly to be made with each actuation of the control operator. The second mode may enable the working assembly to float (e.g., ride along the surface being traversed and conform to contours encountered). Accordingly, some example embodiments described herein provide a mechanism by which to selectively adjust bucket height or allow bucket height to float using a single control operator.

FIG. 1 illustrates an example of a walk behind, powered device in the form of a snow removal device 10. Although the snow removal device 10 of FIG. 1 is shown as a walk-behind snow removal device (i.e., a snow blower or snow thrower), it should be appreciated that example embodiments could be employed in connection with other walk behind power equipment as well, such as tillers, mowers, edgers, and/or the like, particularly in cases where the equipment has a fixed relationship between a chassis of the equipment and the working assembly of the equipment, with the option to alter the orientation of the working assembly relative to the mobility assembly.

In some embodiments, the snow removal device 10 may include a chassis 15 or frame to which various components of the snow removal device 10 may be attached. For example, the chassis 15 may support an engine 20, such as a gasoline powered engine, and a working assembly 30. Operation of the engine 20 may be initiated by a recoil starter via pulling of a recoil starter handle by the operator. However, in other embodiments, the engine 20 may alternatively be started via a key, switch or other similar device. Electrically powered machines are also contemplated within the scope of example embodiments. Thus, the engine 20 may be (or may include) an electric motor in some cases.

The snow removal device 10 may include wheels 40 or continuous tracks forming a mobility assembly on which a substantial portion of the weight of the snow removal device 10 may rest, when the snow removal device 10 is stationary. The mobility assembly (e.g., the wheels 40 or continuous tracks) may also provide for mobility of the snow removal device 10. In some cases, the mobility assembly may be driven via power from the engine 20. However, in other cases, the mobility assembly may simply provide for mobility of the snow removal device 10 responsive to pushing by the operator. In other words, for example, the mobility assembly may be an active or passive provider of mobility for the snow removal device 10. In some embodiments, the mobility assembly may selectively provide forward or reverse power to each of the wheels 40. The selective provision of power to the wheels 40 means that, for example, one wheel could be powered while the wheel on the opposite side is not powered. However, in some cases, braking forces may also be provided to the wheel that is not powered to improve the ability of the operator to control a tight turn with minimal physical effort. This feature may enhance turning capabilities and general control capabilities for the snow removal device 10.

In this example, the working assembly 30 may be a dual stage snow thrower. As such, the working assembly 30 includes a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. However, it should be appreciated that the working assembly 30 of some embodiments could include a power brush or other implement used to move snow toward a second stage device (e.g., the impeller) for ejection from the working assembly 30. The working assembly 30 could also include a single stage auger or impeller or structures for performing another work function (e.g., a blade for mowing or edging, or a tine assembly for tilling). In an example embodiment, the working assembly 30 may be powered via operable coupling to the engine 20. The operable coupling of the working assembly 30 to the engine 20 may be selectively engaged and/or disengaged (e.g., via a clutch, one or more selectively engageable chains/belts/pulleys, a friction wheel or other similar devices). Components of the working assembly 30 (e.g., the auger and the impeller) may be housed in a bucket assembly 32 (or bucket).

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and a discharge chute 50. As such, for example, the ejection path may begin proximate to an input of the impeller, at which point snow is imparted with momentum at an output of the impeller to be pushed toward, and ultimately through, the discharge chute 50.

In an example embodiment, the snow removal device 10 may further include a control panel 60, which may include ignition controls, operating levers (e.g., operating triggers 62) and/or other control operators or informational gauges. The control panel 60 may be provided to be accessible from the rear of the powered device 10 by an operator standing or walking behind the snow removal device 10 (e.g., at an operating station) and capable of pushing, steering or otherwise controlling movement of the snow removal device 10 using a handlebar assembly 70 or some other steering assembly. The control panel 60 may be supported by or included as part of the handlebar assembly 70. In some examples, various ones of the operating triggers 62 may be employed to control various components of the mobility assembly and/or the working assembly 30. As such, for example, different ones of the operating triggers 62 may be operably coupled to various components to enable remote operator control of the respective components. In an example embodiment, operation of the operating triggers 62 may selectively engage or disengage drive power to the wheel on the same side as the corresponding operating trigger 62. Moreover, in some cases, operation of the operating triggers 62 may initiate braking. Thus, for example, the operating triggers 62 may be examples of a remote actuator capable of a single actuation to both remove drive power and simultaneously apply braking power to one of the drivable components.

The control of various other functions or operations of the snow removal device 10 may be controlled by corresponding ones of various other control operators 63 or levers. Each control operator 63 may have a corresponding function that is executable by actuation of the corresponding control operator 63. For example, control operators 63 may be used to orient the discharge chute 50, engage power-propelled forward or reverse motion of the snow removal device 10, control height adjustments as described herein, or perform other functions.

Figure 2:
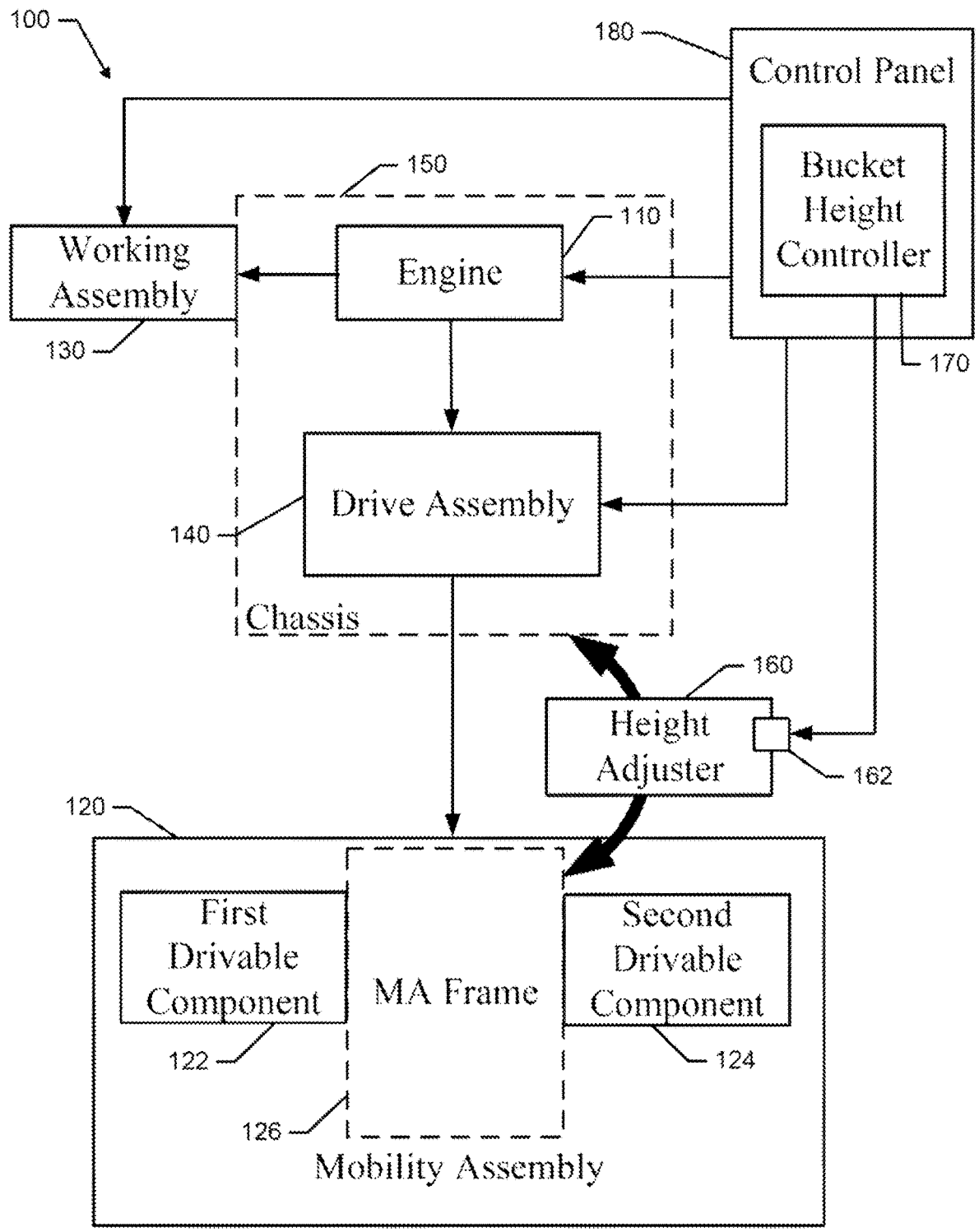
FIG. 2 illustrates a block diagram of a walk-behind, powered device according to an example embodiment.

Since, as indicated above, the snow removal device 10 of FIG. 1 is merely one example of a device on which example embodiments may be practiced, FIG. 2 is provided to facilitate a more general description of devices on which an example embodiment may be practiced. In this regard, FIG. 2 illustrates a block diagram of a powered device 100 in accordance with an example embodiment. It should be appreciated that the snow removal device 10 is one specific example of the powered device 100.

As shown in FIG. 2, the powered device 100 may include an engine 110 and a mobility assembly 120. The mobility assembly 120 may be operably coupled to the engine 110 to enable the powered device 100 to move over a ground surface upon which the powered device 100 is operable. Although the mobility assembly 120 may enable the operator to move the powered device 100 without power being applied to the mobility assembly 120 from the engine 110 (e.g., when the operator pushes the powered device 100), the engine 110 may at least be capable of providing power to the mobility assembly 120. The engine 20 described above is one example of the engine 110 of FIG. 2.

The mobility assembly 120 may include a first drivable component 122 and a second drivable component 124. The first and second drivable components 122 and 124 may be wheels (e.g., the wheels 40 of FIG. 1), continuous tracks (see FIGS. 3-5), or any other suitable components that can be powered to cause the powered device 100 to move over the ground. In an example embodiment, the first and second drivable components 122 and 124 may be operably coupled to a mobility assembly frame 126 that may support the first and second drivable components 122 and 124. The first and second drivable components 122 and 124 may be operably coupled to a drive shaft that may include a bush/sleeve or other component to split the drive shaft so that each of the first and second drivable components 122 and 124 is independently drivable. As such, the first and second drivable components 122 and 124 may be provided on opposite sides of the powered device 100.

The powered device 100 may further include a working assembly 130 (an example of which is the working assembly 30 of FIG. 1). The working assembly 130 may be operably coupled to the engine 110 to perform a working function responsive at least in part to operation of the engine 110. As mentioned above, the working assembly 130 could perform working functions such as snow removal, mowing, edging, tilling and/or the like.

In an example embodiment, the powered device 100 may further include a drive assembly 140 that may provide the operable coupling between the engine 110 and the mobility assembly 120. The drive assembly 140 may include a transmission, friction drive, and/or other components (e.g., a hydraulic system) configured for transferring power from the engine 110 to the mobility assembly 120. As such, the drive assembly 140 may selectively provide forward drive power or reverse drive power to the mobility assembly. In this regard, for example, the drive assembly 140 may transfer rotary power through a series of gears, frictionally engaged components, and/or the like to the first and second drivable components 122 and 124 to turn the first and second drivable components in a desired direction (i.e., forward or reverse). In a first configuration, the drive assembly 140 may provide no power to either of the first and second drivable components 122 and 124 (so the operator can push the powered device 100), or provide power to both of the first and second drivable components 122 and 124, simultaneously in the same direction (i.e., forward or reverse). While it is also possible to provide power to only one of the first or second drivable components 122 and 124 while no power is provided to the other, some example embodiments may further provide the ability to provide braking forces simultaneously to the first drivable component 122 while drive power is being provided to the second drivable component 124 (or vice versa). Providing combined braking and power in this manner may enable a very tight turn capability (e.g., a near zero turning radius). In still other embodiments, power may be applied to both of the first and second drivable components 122 and 124 simultaneously, but in opposing directions.

In accordance with an example embodiment, the drive assembly 140 and the engine 110 may each be supported by a chassis 150 (e.g., chassis 15 of FIG. 1). However, in some cases, the drive assembly 140 could alternatively be supported by the mobility assembly frame 126. In either case, the chassis 150 may be rigidly connected to the working assembly 130 so that the working assembly 130 effectively has a fixed orientation relative to the chassis 150. Accordingly, in order to change the interaction between the working assembly 130 and the ground, the chassis 150 would need to be adjusted relative to the mobility assembly 120.

To provide for adjustability of the relative positioning between the working assembly 130 and the mobility assembly 120, some example embodiments may employ a height adjuster 160. The height adjuster 160 may be positioned between the chassis 150 and mobility assembly frame 126 of the mobility assembly 120 to control the relative positioning therebetween. In an example embodiment, the chassis 150 may be pivotally mounted to the mobility assembly frame 126 with the height adjuster 160 extending between the portion of the chassis 150 and a portion of the mobility assembly frame 126 to either prevent or allow pivoting of the chassis 150 relative to the mobility assembly frame 126. Moreover, in some cases, the chassis 150 may be mounted such that a pivot axis 151 (extending into the page in FIG. 4) about which the chassis 150 moves relative to the mobility assembly frame 126 is either substantially aligned with, or at least positioned proximate to, a center of gravity of the chassis 150 (and components mounted thereto or thereon). Accordingly, a relatively small amount of force may be used to pivot the chassis 150 relative to the mobility assembly frame 126. Additionally, a relatively small amount of force may be needed (by the height adjuster 160) to maintain the position of the chassis 150 relative to the mobility assembly frame 126.

As shown in FIG. 2, the height adjuster 160 may be actuated by a bucket height controller 170, which may be a lever or other control operator disposed at a control panel 180 (e.g., control panel 60 of FIG. 1) of the powered device 100. In an example embodiment, the height adjuster 160 may be a gas strut, or fluid/gas/air cylinder. Furthermore, in some embodiments, the height adjuster 160 may be provided with a remotely operable actuation valve 162 (e.g., a two way valve or actuator). The actuation valve 162 may be operated such that the actuation valve 162 may be opened to enable pressurized air (e.g., ambient air, gas or other fluid) within the air cylinder (of the height adjuster 160) to be moved in either direction through the two way valve to permit movement of a plunger disposed to separate two compartments of the air cylinder in either direction (e.g., toward either of the separate compartments). When the actuation valve 162 is closed, air and/or fluid may be locked in each separate compartment of the air cylinder to fix a position of at least one shaft extending out of an end of the air cylinder from the plunger. The shaft extending out of one end (or both ends) of the air cylinder may therefore elongate or contract the length of the height adjuster 160 dependent upon a position of the internal plunger as described above in order to adjust a distance between the corresponding portions of the chassis 150 and mobility assembly frame 126 along the entire range of motion of the shaft. In this regard, for example, the height adjuster 160 may extend between respective portions of the chassis 150 and mobility assembly frame 126 to define a distance therebetween and correspondingly define a height or level of the working assembly 130 relative to the ground.

In an example embodiment, the air pressure and/or fluid locked in each compartment of the height adjuster 160 may be allowed to momentarily increase or decrease to dampen shocks/vibrations. However, responsive to a shock increasing pressure in one compartment, the increasing pressure may exert a force in an opposing direction to tend to return the height adjuster 160 to its prior steady state position. Accordingly, the height adjuster 160 may decouple (or at least inefficiently couple) the chassis 150 and mobility assembly frame 126 relative to shock and/or vibration in addition to controlling their relative orientation.

The number and location of the positions at which the plunger may be fixed within the air cylinder (e.g., by closure of the actuation valve 162) may not be predefined. As such, the plunger may be disposed at any of an infinite number of potential locations within the confines of the air cylinder. This means that the height adjuster 160 is not limited to being fixable at discrete intervals since the air cylinder does not have any discrete fixing points therein. Having a capability for non-discrete fixing locations, or infinite number of fixing points along the range of motion of the height adjuster 160, may provide an advantage to operators that might otherwise find that one fixed position is too high, while the next available fixed position is too low. Furthermore, the ability to remotely actuate the plunger position may further provide an operator with the ability to adjust the height of the working assembly 130 (e.g., snow removal device bucket) without leaving the operator station and without the use of tools.

In an example embodiment, the bucket height controller 170 for positioning the plunger and fixing a length of the height adjuster 160 may be provided as a hand operated lever or other control operator disposed at the control panel 180, as mentioned above. However, the bucket height controller 170 may also be uniquely designed to control the mode of operation of the height adjuster 160 between a first mode in which the height of the working assembly 130 may be adjusted to move to and maintain any of the infinite number of fixing points that can be defined for the plunger (and corresponding lengths of the height adjuster 160), and a second mode in which the working assembly 130 is allowed to float (i.e., is not maintained at any fixed height adjuster length 160).

In an example embodiment, the bucket height controller 170 may be operated differently in each of the respective modes. For example, the bucket height controller 170 may be cycled for adjustments to height adjuster 160 length in the first mode. However, the bucket height controller 170 may be retained in a deflected or actuated position to enable dynamic adjustments to height adjuster 160 length in the second mode responsive to the terrain encountered.

The first mode has effectively been described above. In this regard, in the first mode, the bucket height controller 170 is actuated initially to open the actuation valve 162 and allow air or gas in the cylinder to be moved to reposition the plunger and change the effective length of the height adjuster 160 to a desired length (and corresponding height or position of the working assembly 130). Then the actuation valve 162 is closed by releasing the bucket height controller 170 (thereby completing cycling of the bucket height controller 170) to effectively lock the height adjuster 160 at the desired length by fixing the position of the plunger within the cylinder.

In the second mode, the bucket height controller 170 is actuated, but retained in the actuated state. While the bucket height controller 170 is retained in the actuated state, the actuation valve 162 remains open to allow gas or air to move to either compartment in the cylinder and effectively allow the length of the height adjuster 160 to be moved responsive to either operator control or responsive to the terrain features on the ground. This "floating" condition may allow the working assembly 130 (e.g., the bucket assembly 32 of FIG. 1) to be operated such that the second mode is effectively a terrain following mode.

Figure 3:
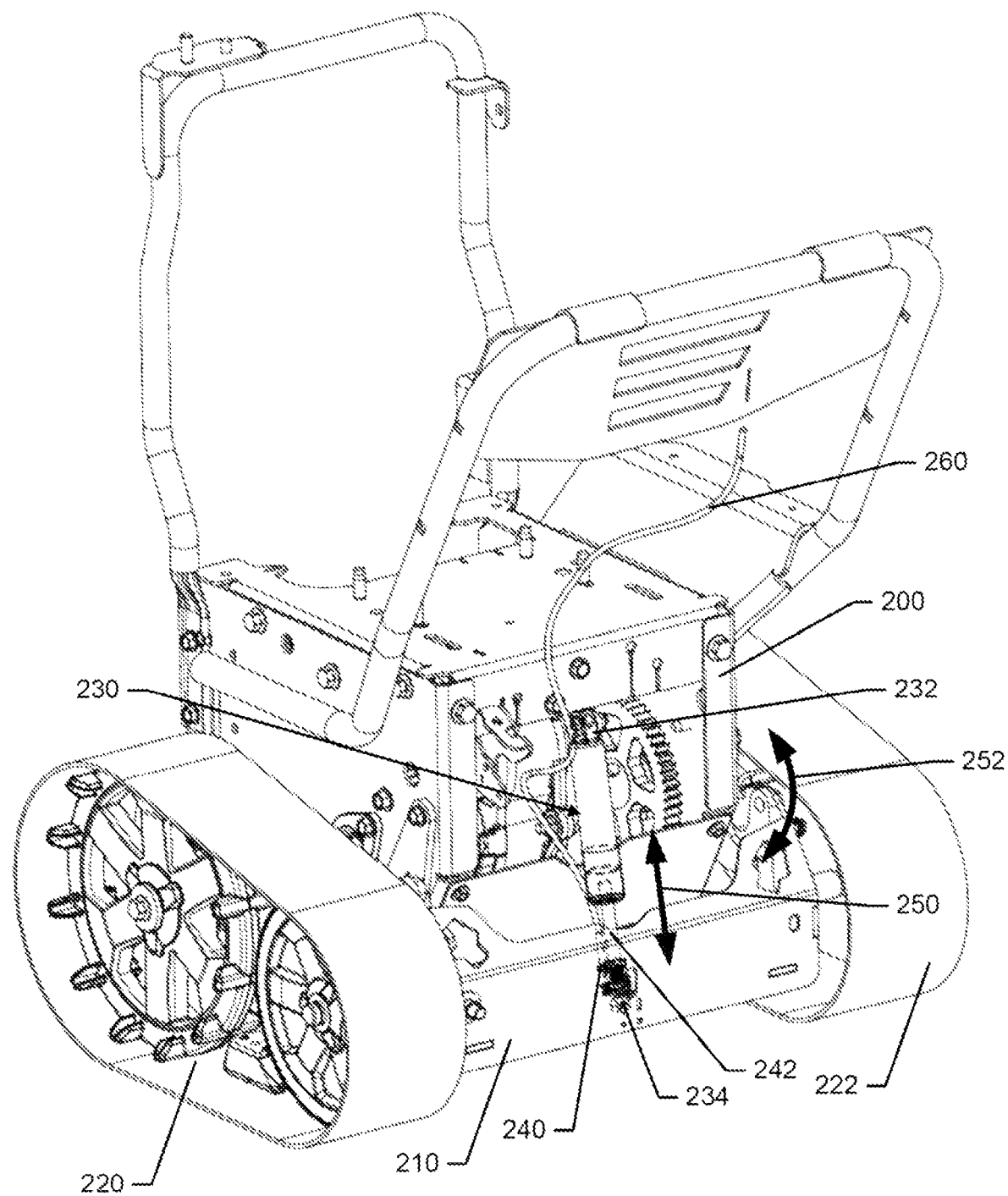
FIG. 3 illustrates a perspective view of one configuration that may be used to embody various ones of the components described above in reference to FIG. 2 in accordance with an example embodiment.
Figure 4:
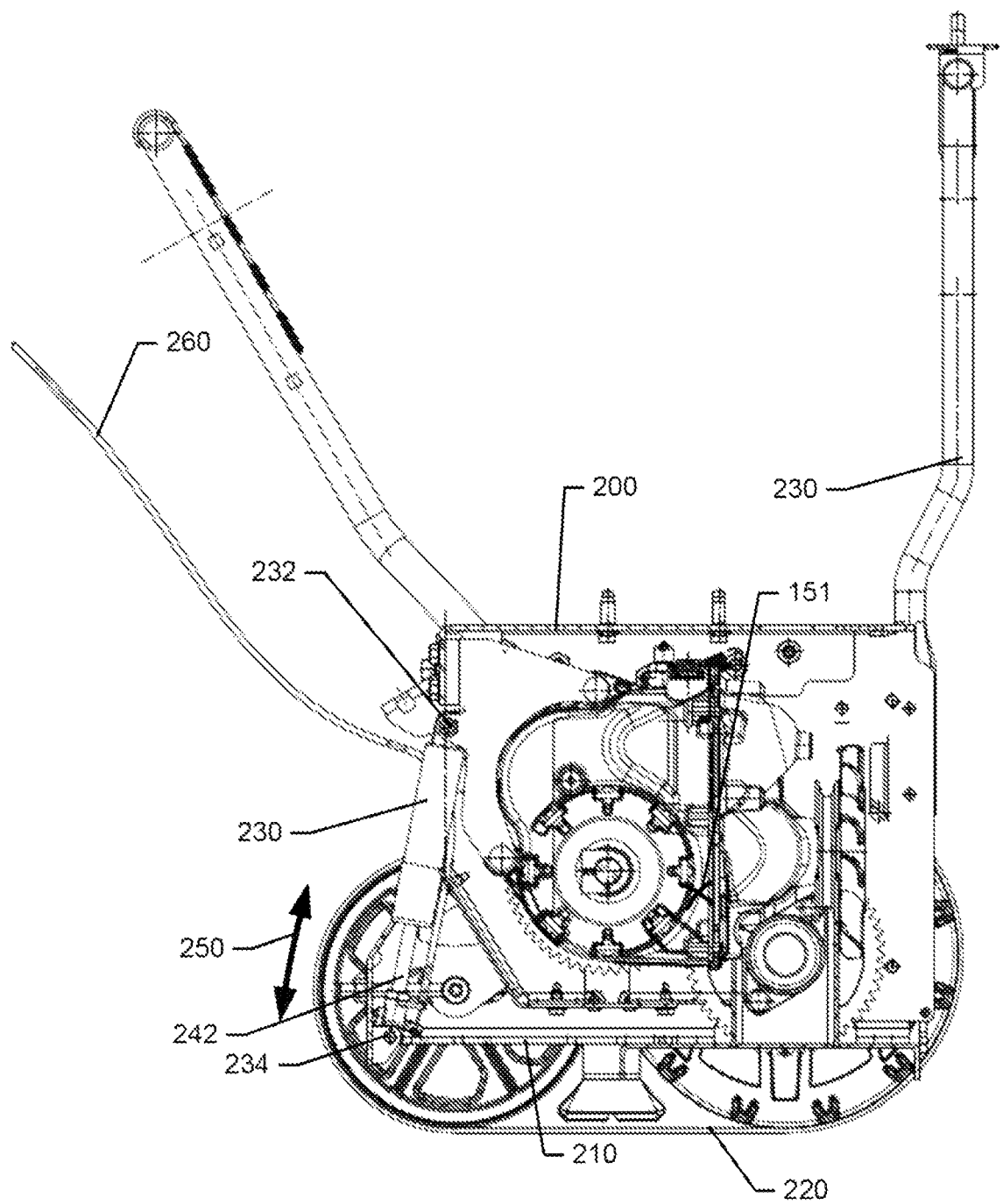
FIG. 4 illustrates a cross sectional view taken between opposing sides of a mobility assembly of a powered device in accordance with an example embodiment.

FIG. 3 illustrates a perspective view of one configuration that may be used to embody various ones of the components described above in reference to FIG. 2 and FIG. 4 illustrates a cross sectional view taken between the opposing sides of the mobility assembly. In this regard, FIGS. 3 and 4 illustrate a chassis 200 pivotally mounted to a mobility assembly frame 210. The mobility assembly of this example includes continuous tracks 220 and 222 that are operably coupled to the mobility assembly frame 210. An air cylinder 230 is operably coupled to the chassis 220 (e.g., at a rear portion thereof (i.e., a side of the chassis 220 opposite the side to which the bucket is attached)) via a pivot joint 232 at a first end of the air cylinder 230. The air cylinder 230 is also operably coupled to the mobility assembly frame 210 via a pivot joint 234 at a second end of the air cylinder 230. An actuation valve 240 (an example of actuation valve 162 above) is disposed at the air cylinder 230 to allow a shaft 242 of the air cylinder 230 to be extended out of or drawn further into the air cylinder 230 to alter the effective length of the air cylinder 230 in the manner described above in reference to adjusting the effective length of the height adjuster 160 above. In this regard, double arrow 250 shows the possible adjustments to the effective length of the air cylinder 230 and double arrow 252 shows the pivoting of the chassis 200 relative to the mobility assembly frame 210 that may correspondingly occur responsive to adjusting the effective length of the air cylinder 230. The height of any bucket or other working assembly that may be attached to the chassis 220 is then correspondingly also changed relative to the ground.

As shown in FIGS. 3 and 4, the actuation valve 240 is operated via a cable 260 that extends from the actuation valve 240 to a lever (e.g., the bucket height controller 170 on the control panel 180). The cable 260 may be a Bowden cable in some embodiments. As such, dependent upon a position of the bucket height controller 170, the cable 260 may transmit a force to either close or open the actuation valve 240 to initiate control of bucket height (or working assembly height) in one of two modes (e.g., the first and second modes described above).

Figure 5A:
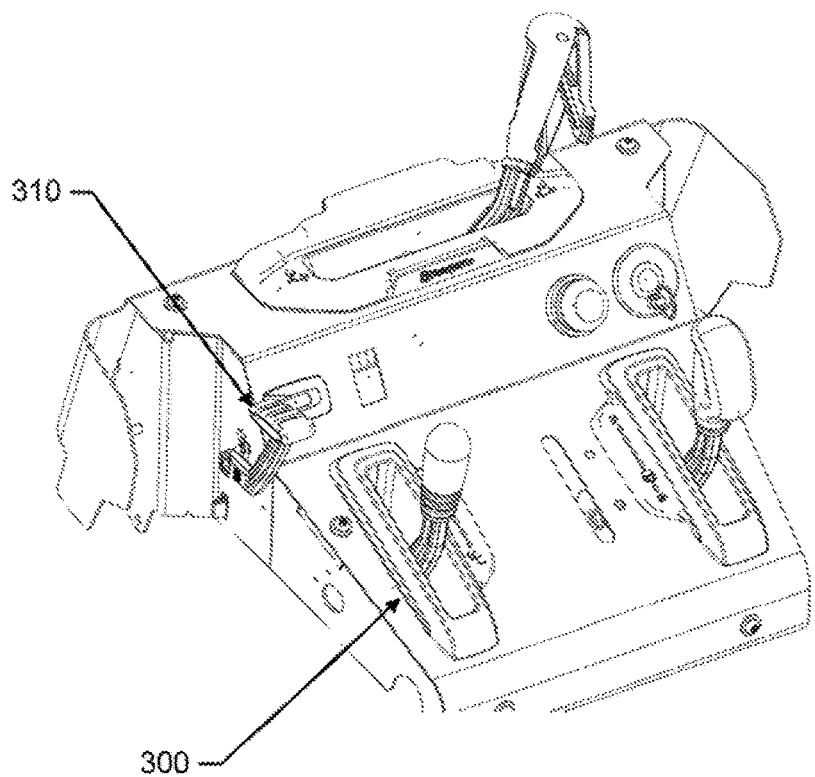
FIG. 5A illustrates a perspective view of one example instance of a control panel having an example of the bucket height controller in the form of lever according to an example embodiment.
Figure 5B:
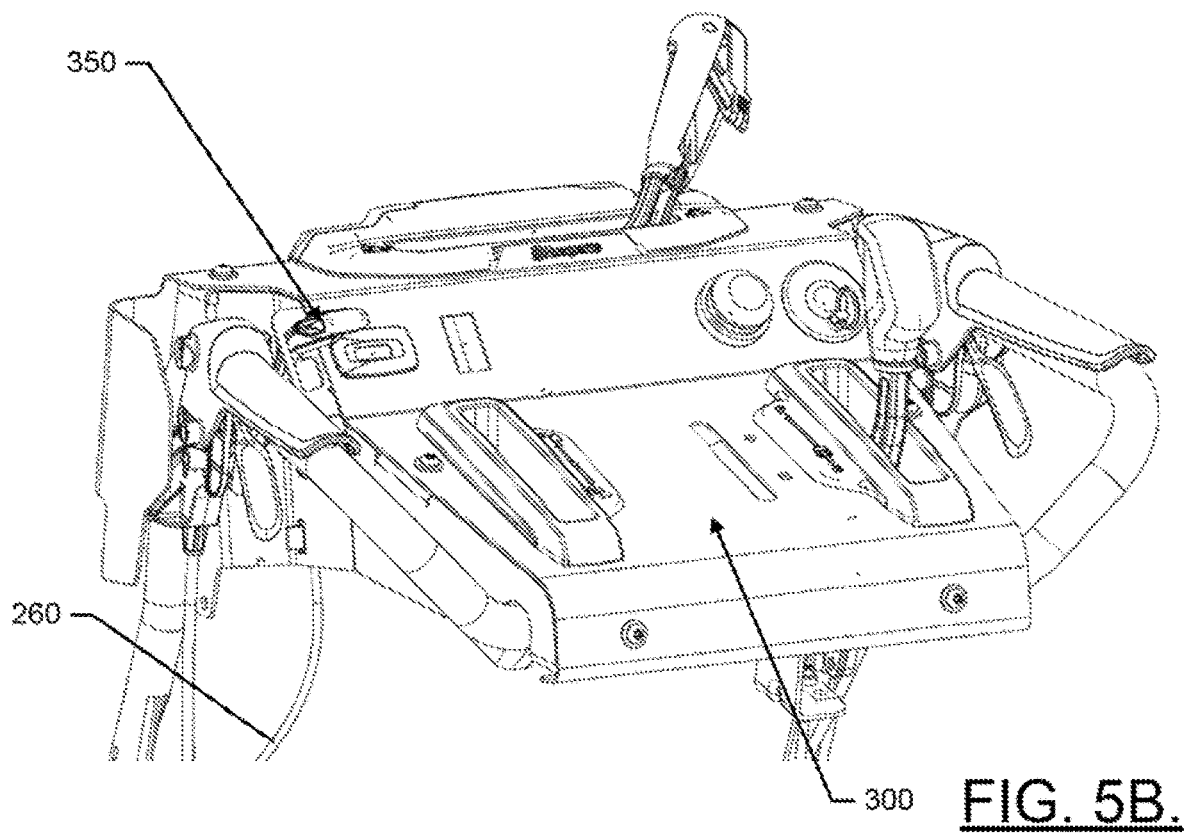
FIG. 5B illustrates a perspective view of an alternative instance of a control panel having another example of the bucket height controller in the form of an alternatively structured lever according to an example embodiment.

The bucket height controller 170 could be implemented in various different ways. FIGS. 5A and 5B illustrate two specific example implementations for the bucket height controller 170, but other options are also possible. As mentioned above, the bucket height controller 170 may be configured such that cycled operation of the bucket height controller 170 allows adjustments to fix height adjuster 160 length in a first mode in which the height adjuster 160 is alternately transitioned between a unlocked and locked state. The bucket height controller 170 may also be configured such that the bucket height controller 170 may be retained in a deflected or actuated position to enable dynamic or floating adjustments to height adjuster 160 length in the second mode.

FIG. 5A illustrates a perspective view of one example instance of a control panel 300 having an example of the bucket height controller 170 in the form of lever 310. Lever 310 is disposed at one side of the control panel 300, but could alternatively be located at other portions of the control panel. As shown in FIG. 5A, the lever 310 may be configured to allow downward motion (e.g., a downward push force) to be applied to the lever 310 for actuation. The lever 310 may include one or more biasing members (e.g., springs) to bias the lever 310 in a rest position. In the first mode, in which the lever 310 is cycled to enable changes in fixed lengths of the height adjuster 160, the lever 310 can be depressed (or actuated) once to unlock the height adjuster 160 to allow changing the length thereof and depressed a second time to lock the lock the height adjuster 160 at the new length. Of note, if the lever 310 is not depressed the second time, the lever 310 will be retained in a depressed state by the design of a guiding assembly 320 (see FIG. 6) that controls the operation of the lever 310.

Referring now to FIG. 6, which is defined by FIGS. 6A, 6B, 6C and 6D, operation of the guiding assembly 320 will be described in accordance with an example embodiment. The guiding assembly 320 may include a cam 322 defining a channel 324 inside which a pin 326 that is attached to a side surface of the lever 310 rides. The channel 324 is shaped such that the pin 326 is directed to pass through points of the channel 324 to various locations shown in FIGS. 6A, 6B, 6C and 6D to cycle through operation in the first or second modes described above. The channel 324 may be formed to extend around an island structure 327 that facilitates direction the pin 326 through the channel 324. In this regard, for example, FIG. 6A shows the lever 310 in an inactive rest position in which the actuation valve 162 is shut so that the height adjuster 160 is retained at its current fixed length. When the lever 310 is depressed from the rest position of FIG. 6A, the pin 326 follows a path 330 shown in FIG. 6B to a transition point at which the pin 326 is shown in FIG. 6B. The transition point represents the lowest point of motion of the lever 310 for this actuation operation so that when the operator releases the lever 310, the pin 326 follows the path 332 shown in FIG. 6C to the active rest position at which the pin 326 is located in FIG. 6C. At the active rest position of FIG. 6C, the pin 326 holds the lever in an actuated state (e.g., by contact with a recessed portion formed in the island structure 327) so that the actuation valve 162 is open and the height adjuster is not fixed in length. If the operator leaves the lever 310 alone at this time, the lever 310 will remain in the actuated state at the active rest position of FIG. 6C until another cycle of the lever 310 is initiated. When the lever 310 is retained at the active rest position, the second mode (i.e., the floating mode for the working assembly 130) of operation is maintained. Thus, the length of the height adjuster 160 will remain unfixed and be changeable based on terrain features encountered. However, if the operator cycles the lever 310 again, the lever will follow the path 334 to the second transition position of the pin 326 shown in FIG. 6D. At the second transition position, the lowest point of motion for the lever 310 is again achieved and the operator may release the lever 310 to allow the pin 326 to follow path 336 back to the inactive rest position of FIG. 6A at which point the actuation valve 162 is again shut to fix a length of the height adjuster 160.

The lever 310 is considered to be in the first mode when the lever 310 is cycled fully through the positions of FIGS. 6A-6D in association with a change in fixed length of the height adjuster 160. However, the lever 310 is considered to be in the second mode when the lever 310 is retained at the position shown in FIG. 6C. As can be appreciated from the example of FIGS. 6A-6D, if the lever 310 is disposed at a left side of the control panel 300, the pin 326 would travel around the island structure 327 through the channel 324 in a counterclockwise direction as viewed from the right side of the powered device 100.

Figure 5C:
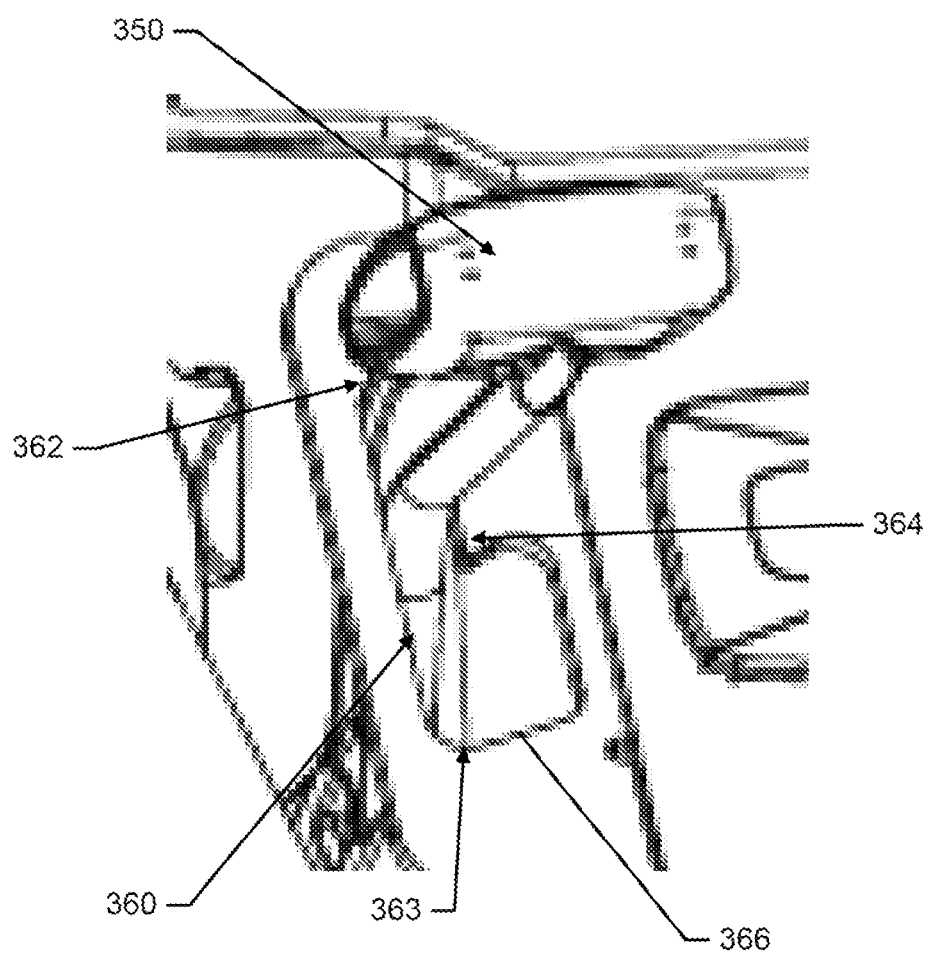
FIG. 5C illustrates a closer view of the bucket height controller of FIG. 5B in accordance with an example embodiment.
Figure 6A:
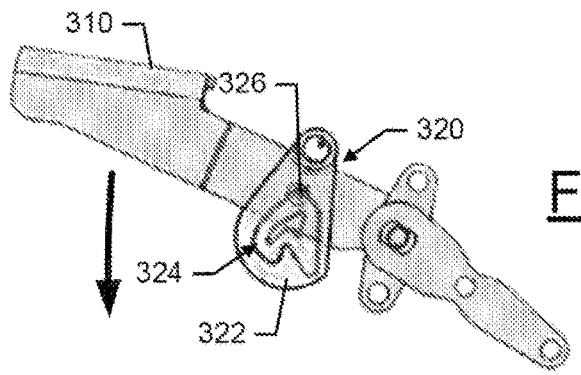
FIG. 6, which is defined by FIGS. 6A, 6B, 6C, and 6D, illustrates operation of the lever of FIG. 5A with respect to a guiding assembly according to an example embodiment.
Figure 6B:
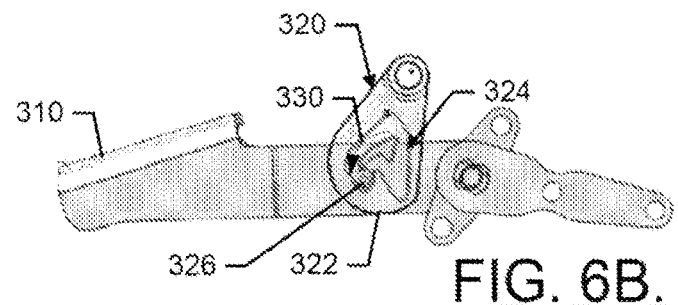
Figure 6C:
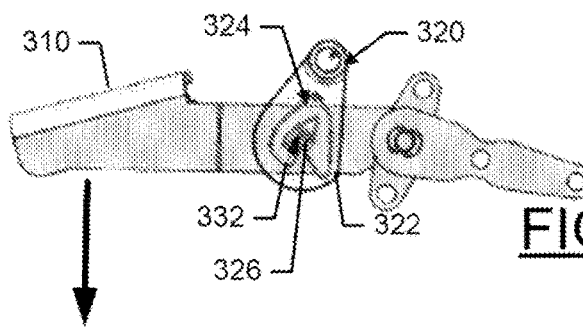
Figure 6D:
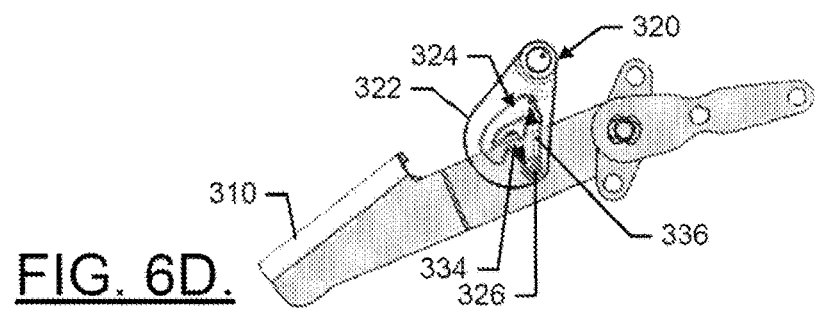

Referring now to FIGS. 5B and 5C, an alternative structure for supporting operation of a lever 350 is illustrated. The lever 350 may be operable within a guide channel 360 defined at or near the control panel 300. The lever 310 may be biased (e.g., by a spring or other biasing member) to the position shown in FIG. 5B (i.e., at a first end 362 or forward end of the channel 360). This position may be referred to as an inactive rest position since the actuation valve 162 is not actuated while the lever 350 is in this position. When the operator depresses the lever 350, the lever 350 may move away from the first end 362 of the guide channel 360 toward a second end 363 thereof. The guide channel 360 may be formed such that movement between the first and second ends 362 and 363 is generally along a longitudinal centerline of the guide channel 360 and therefore considered to be longitudinal movement of the lever 350. The longitudinal movement of the lever 350 may cause a force to be transmitted through the cable 260 to the actuation valve 162, as described above, to actuate the actuation valve and allow the length of the height adjuster 160 to be adjusted. Otherwise, when the lever 350 is disposed proximate to the first end 362, the lever 350 is in the inactive rest position and the actuation valve 162 is shut, thereby holding the current length of the height adjuster 160.

When the lever 350 is moved toward the second end 363 past a catch member 364, the guide channel 360 may expand in width in a transverse direction (i.e., substantially perpendicular to the longitudinal direction and inward—down and over). The catch member 364 may allow the lever 350 to be moved to the side slightly (e.g., in the transverse direction) to be held in an active rest position where the actuation valve 162 remains open to keep the height adjuster 160 in the floating state of the second mode as described above. If the lever 350 is pressed toward the second end 363 again, the lever 350 may encounter sliding surface 366, which is positioned to redirect the lever 350 so that, upon release of the lever 350, the lever 350 can return to the inactive rest position responsive to the biasing force applied by the spring or biasing member by movement that is again longitudinal. Thus, the sliding surface 366 provides direction of the lever 350 again in the transverse direction (albeit opposite (i.e., outward) the direction that was used to retain the lever 350 with the catch member 364). When the lever 350 has returned to the inactive rest position, the actuation valve 162 is again shut to hold the current length of the height adjuster 160.

Thus, a walk-behind, powered device in accordance with an example embodiment may include an engine, a chassis supporting the engine, a mobility assembly operably coupled to the engine to provide mobility of the powered device responsive at least in part to operation of the engine, and a working assembly operably coupled to the engine to perform a working function responsive at least in part to operation of the engine. The mobility assembly may be operably coupled to a mobility assembly frame. The working assembly may have a fixed orientation relative to the chassis. The chassis may be pivotally mounted to the mobility assembly frame. A height adjuster may be disposed between respective portions of the mobility assembly frame and the chassis to control positioning of the chassis relative to the mobility assembly frame based on a length of the height adjuster. The length of the height adjuster may be changeable based on positioning of a control operator disposed at a control panel.

The powered device (or height adjustment assembly) of some embodiments may include additional features that may be optionally added either alone or in combination with each other. For example, in some embodiments, (1) the height adjuster may be configured to operate in a first mode in which the length of the height adjuster is fixable over a range on non-discrete lengths based on a position of the control operator, and a second mode in which the length of the height adjuster is continuously not fixed and is therefore "floating." In an example embodiment, (2) the control operator may be cycled for adjustments to the length of the height adjuster in the first mode, and the control operator may be retained in an actuated position to enable dynamic adjustment to length of the height adjuster in the second mode responsive to terrain encountered by the mobility assembly, the working assembly, and/or the powered device. In some cases, (3) the control operator may include a hand operated lever disposed at the control panel. The lever may be configured to interface with a guiding assembly. The guiding assembly may be configured to hold the lever in the actuated position to a single actuation from an inactive rest position, and may be configured to alternately switch between being in the actuated position and inactive rest position responsive to multiple actuations of the lever. In some examples, (4) the guiding assembly may include a cam defining a channel inside which a pin disposed at a side surface of the lever rides. The channel may be shaped such that the pin is directed through the channel to hold the lever in the actuated position or allow the lever to switch between being in the actuated position and inactive rest position based on actuation of the lever. In an example embodiment, as an alternative to (3) or the combination of (3) and (4), (5) the control operator may include a hand operated lever disposed at the control panel, and wherein the lever is configured to interface with a guide channel. The guide channel may be configured to enable the lever to be held in the actuated position or cycled between the actuated position and inactive rest position based on a path of the lever within the guide channel. In such an example, (6) the guide channel may extend in a longitudinal direction and includes a catch member offset in a transverse direction to hold the lever in an active rest position in which the lever is retained in the actuated position. In some examples, (7) the guide channel may further include a sliding surface configured, responsive to actuation of the lever from the active rest position, to redirect the lever to enable a return to the inactive rest position via movement in the longitudinal direction.

In some embodiments, any or all of the modifications of (1) to (7) may be employed and the height adjuster may be an infinitely adjustable component, such as a gas cylinder. The gas cylinder may include an actuation valve operably coupled to the control operator. The actuation valve may be operably coupled to the control operator via a cable. The mobility assembly may include a set of wheels or a continuous track. Additionally or alternatively, the powered device may be a snow removal device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A walk-behind, powered device comprising:
an engine;
a chassis configured to support the engine;
a mobility assembly comprising a mobility assembly frame, wherein the mobility assembly frame is configured to pivot relative to the chassis;
a working assembly operably coupled to the engine to perform a working function responsive at least in part to operation of the engine, wherein the working assembly has a fixed orientation relative to the chassis;
a control panel operably coupled to the chassis and comprising a control operator; and
a height adjuster operably coupled to the mobility assembly frame and to the chassis,
wherein the height adjuster is configured to control positioning of the chassis relative to the mobility assembly frame based on a length of the height adjuster,
wherein the length of the height adjuster is changeable based on positioning of the control operator,
wherein the height adjuster is configured to operate in a first mode in which the length of the height adjuster is fixable over a range of non-discrete lengths based on a position of the control operator, and a second mode in
which the length of the height adjuster is continuously
not fixed, and
wherein the control operator is cycled for adjustments to
the length of the height adjuster in the first mode, and
the control operator is retained in an actuated position
to enable dynamic adjustment to length of the height
adjuster in the second mode responsive to terrain
encountered by the powered device.

2. The powered device of claim 1, wherein the control operator comprises a hand operated lever disposed at the control panel, and wherein the lever is configured to interface with a guiding assembly, the guiding assembly being configured to hold the lever in the actuated position responsive to a single actuation from an inactive rest position, and configured to alternately switch between being in the actuated position and inactive rest position responsive to multiple actuations of the lever.

3. The powered device of claim 2, wherein the guiding assembly comprises a cam defining a channel inside which a pin disposed at a side surface of the lever rides, the channel being shaped such that the pin is directed through the channel to hold the lever in the actuated position or allow the lever to switch between being in the actuated position and inactive rest position based on actuation of the lever.

4. The powered device of claim 1, wherein the control operator comprises a hand operated lever disposed at the control panel, and wherein the lever is configured to interface with a guide channel, the guide channel being configured to enable the lever to be held in the actuated position or cycled between the actuated position and inactive rest position based on a path of the lever within the guide channel.

5. The powered device of claim 4, wherein the guide channel extends in a longitudinal direction and includes a catch member offset in a transverse direction to hold the lever in an active rest position in which the lever is retained in the actuated position.

6. The powered device of claim 5, wherein the guide channel further comprises a sliding surface configured, responsive to actuation of the lever from the active rest position, to redirect the lever to enable a return to the inactive rest position via movement in the longitudinal direction.

7. The powered device of claim 1, wherein the height adjuster is an infinitely adjustable component.

8. The powered device of claim 1, wherein the height adjuster comprises a gas cylinder.

9. The powered device of claim 8, wherein the gas cylinder comprises an actuation valve operably coupled to the control operator.

10. The powered device of claim 9, wherein the actuation valve is operably coupled to the control operator via a cable.

11. The powered device of claim 1, wherein the mobility assembly comprises a set of wheels or a continuous track.

12. The powered device of claim 1, wherein the powered device comprises a snow removal device.

13. A working assembly height adjustment system for a walk behind, powered device, the system comprising:
a chassis supporting an engine of the powered device;
a mobility assembly frame supporting a mobility assembly operably coupled to the engine to provide mobility of the powered device responsive at least in part to operation of the engine; and
a height adjuster disposed between respective portions of the mobility assembly frame and the chassis to control positioning of the chassis relative to the mobility assembly frame based on a length of the height adjuster,
wherein the working assembly has a fixed orientation relative to the chassis,
wherein the chassis is pivotally mounted to the mobility assembly frame, and
wherein the length of the height adjuster is changeable based on positioning of a control operator disposed at a control panel of the powered device,
wherein the height adjuster is configured to operate in a first mode in which the length of the height adjuster is fixable over a range on non-discrete lengths based on a position of the control operator, and a second mode in which the length of the height adjuster is continuously not fixed, and
wherein the control operator is cycled for adjustments to the length of the height adjuster in the first mode, and the control operator is retained in an actuated position to enable dynamic adjustment to length of the height adjuster in the second mode responsive to terrain encountered by the powered device.

14. The system of claim 13, wherein the control operator comprises a hand operated lever disposed at the control panel, and wherein the lever is configured to interface with a guiding assembly, the guiding assembly being configured to hold the lever in the actuated position responsive to a single actuation from an inactive rest position, and configured to alternately switch between being in the actuated position and inactive rest position responsive to multiple actuations of the lever.

15. The system of claim 14, wherein the guiding assembly comprises a cam defining a channel inside which a pin disposed at a side surface of the lever rides, the channel being shaped such that the pin is directed through the channel to hold the lever in the actuated position or allow the lever to switch between being in the actuated position and inactive rest position based on actuation of the lever.

16. The system of claim 13, wherein the control operator comprises a hand operated lever disposed at the control panel, and wherein the lever is configured to interface with a guide channel, the guide channel being configured to enable the lever to be held in the actuated position or cycled between the actuated position and inactive rest position based on a path of the lever within the guide channel.

17. The system of claim 16, wherein the guide channel extends in a longitudinal direction and includes a catch member offset in a transverse direction to hold the lever in an active rest position in which the lever is retained in the actuated position.

18. The system of claim 17, wherein the guide channel further comprises a sliding surface configured, responsive to actuation of the lever from the active rest position, to redirect the lever to enable a return to the inactive rest position via movement in the longitudinal direction.

19. The system of claim 13, wherein the height adjuster is an infinitely adjustable component.

20. The system of claim 13, wherein the height adjuster comprises a gas cylinder.

21. The system of claim 20, wherein the gas cylinder comprises an actuation valve operably coupled to the control operator.

22. The system of claim 21, wherein the actuation valve is operably coupled to the control operator via a cable.

* * * * *